United States Patent [19]
Ito et al.

[11] Patent Number: 5,656,983
[45] Date of Patent: Aug. 12, 1997

[54] INDUCTIVE COUPLER FOR TRANSFERRING ELECTRICAL POWER

[75] Inventors: Makoto Ito; Kazuyoshi Takeuchi; Goro Asahi, all of Kariya, Japan

[73] Assignee: Kabushiki Kaisha Toyoda Jidoshokki Seisakusho, Kariya, Japan

[21] Appl. No.: 428,279

[22] Filed: Apr. 25, 1995

Related U.S. Application Data

[63] Continuation of Ser. No. 149,630, Nov. 9, 1993, abandoned.

[30] Foreign Application Priority Data

Nov. 11, 1992 [JP] Japan ............................ 4-301095
Nov. 19, 1992 [JP] Japan ............................ 4-309998

[51] Int. Cl.⁶ .................. H01F 3/00; H01F 17/06; H01F 27/24; H01F 7/00
[52] U.S. Cl. .............. 335/297; 336/178; 336/213; 336/233
[58] Field of Search ............... 335/210, 297, 335/281; 336/83, 178, 212, 233

[56] References Cited

U.S. PATENT DOCUMENTS

| | | | |
|---|---|---|---|
| 3,851,287 | 11/1974 | Miller | 336/84 |
| 4,347,472 | 8/1982 | Lemelson | 320/2 |
| 4,621,248 | 11/1986 | Shigeta | 336/178 |
| 5,204,653 | 4/1993 | Saitoh | 336/178 |
| 5,216,402 | 6/1993 | Carosa | 336/66 |

FOREIGN PATENT DOCUMENTS

| | | | |
|---|---|---|---|
| 649498 | 12/1928 | France | 336/178 |
| 2124478 | 11/1972 | Germany | 336/178 |
| 2325703 | 12/1974 | Germany | 336/178 |
| 61-177417 | 11/1986 | Japan . | |
| 151006 | 6/1988 | Japan . | |
| 63-240331 | 10/1988 | Japan . | |

*Primary Examiner*—Leo P. Picard
*Assistant Examiner*—Stephen T. Ryan
*Attorney, Agent, or Firm*—Brooks Haidt Haffner & Delahunty

[57] ABSTRACT

An inductive coupler forming a closed magnetic circuit by mating a primary core assembly having a primary winding and a secondary core assembly having a secondary winding for transferring electrical power from the primary winding to the secondary winding by electromagnetic induction. A thin magnetic protective sheet having high permeability is attached to the mating surfaces of at least one of said primary and secondary core assemblies or placed to be held by the core assemblies. The magnetic sheet can protect the mating surfaces of ferrite cores, if such cores are used, from breakage by absorbing and dispersing the shock of impact caused when the mating surfaces are abutted against each other to close the cores. Provision of a slit or slits in the magnetic protective sheet can reduce eddy currents flowing in the magnetic sheet.

6 Claims, 8 Drawing Sheets

INDUCTIVE COUPLER FOR TRANSFERRING ELECTRICAL POWER

This application is a continuation of application Ser. No. 08/149,630, filed Nov. 9, 1993, now abandoned.

This application claims the priority of Japanese patent application No. 4-301095 filed Nov. 11, 1992 and Japanese patent application No. 4-309998 filed Nov. 19, 1992, which are incorporated herein by reference.

BACKGROUND OF THE INVENTION

The present invention relates to an inductive coupler, and more specifically to a separable coupler which is operable by electromagnetic induction to transfer electrical power without metal-to-metal contact and adapted for use in a system for recharging a battery for electrically powered vehicles, and the like.

There has been known an inductive coupler which has a primary coil wound around a primary core and connected to the source of electrical power and a secondary coil wound around a secondary core matable or engageable with the primary counterpart, wherein alternating current applied across the primary winding produces a moving magnetic field which in turn induces a voltage in the secondary winding, as a result of which the electrical power is transferred from the primary winding to the secondary winding. The primary and secondary cores may be configured in various shapes, e.g. a channel shape as disclosed in Publication of unexamined Japanese patent application No. 63-151006 (1988), coaxial cylindrical shape as described in Publication of unexamined Japanese patent application No. 63-240331 (1988), and "E" shape such as the one shown in FIG. 1 hereof. The above "E" shaped and coaxial cylindrical shaped cores may also be referred to as "tripod" type cores because of their three-leg configurations as seen in axial cross sectional views thereof. The channel shaped cores may be called as "bipod" type because of its two-legged geometry.

Each core is usually made up of laminations, or a number of laminated thin plates having magnetic properties and insulated from one another. Solid ferrite cores may be used advantageously to reduce the core loss that is caused by high frequency operation of the inductive coupler. It should be noted, however, that the ferrite is hard but brittle, and hence there is a fear that the cores may be nicked or broken at their mating surfaces by the shock of impact caused when they are jointed together for the transfer of the electrical power. Publication of unexamined Japanese utility model application No. 61-177417 (1986) proposes the use of protective layers of resin, such as nylon or Teflon, coated on the mating surfaces of each core to prevent damage to the surfaces. Such a protective resin covering according to the Publication is effective to prevent the possible breakage of the abutment surfaces of the ferrite cores, but it will form a core-to-core gap that corresponds to twice the resin coating thickness. Since even a slight increase in the core-to-core gap will appreciably affect the power transferring efficiency (=secondary effective power/primary effective power), the use of nonmagnetic resin covering on the cores poses a problem in practical application of the inductive coupler.

In the case of laminated cores in which the mating surfaces are defined by exposed ends of the respective laminae, the surfaces tend to become irregular or uneven so that the primary and secondary cores when closed will form a gap therebetween which is large enough to seriously affect the power transferring efficiency.

SUMMARY OF THE INVENTION

It is an object of the present invention, therefore, to provide an inductive coupler that can solve the above-identified problems.

The above object of the invention can be accomplished by an inductive coupler which comprises a primary core assembly having a primary winding and a secondary core assembly having a secondary winding, wherein the primary and secondary core assemblies are matable at the mating surfaces thereof, thereby forming a magnetic circuit for transferring electrical power from the primary winding to the secondary winding by electromagnetic induction, and a thin magnetic protective sheet having high magnetic permeability is attached to the mating surfaces of at least one of the primary and secondary core assemblies.

According to another embodiment, there is provided an inductive coupler which includes the above primary and secondary core assemblies and a protective sheet member comprised of a magnetic portion having magnetic permeability and a nonmagnetic portion formed integrally with the magnetic portion, wherein the sheet member is placed with the magnetic portion thereof held between the mating surfaces of the primary and secondary core assemblies in their closed position.

Magnetic cores of the core assemblies may be made of either ferrite or laminations of silicon steel plates or amorphous sheets.

In the preferred embodiments, the above magnetic sheet or magnetic portion is attached to the mating surfaces by way of an elastic nonmagnetic sheet or it is made of an elastic material containing therein magnetic particles.

An inductive coupler in still another preferred embodiment comprises the arrangement of the above primary and secondary core assemblies and a magnetic sheet having electrically conductive properties and attached to the mating surfaces of at least one of the primary and secondary core assemblies, wherein the magnetic sheet has therein at least one slit formed in such a way that reduces eddy currents produced in the magnetic sheet. The slit may be formed spirally or it may include a plurality of slits which are arranged in such a way that eddy currents flow along a zigzag path consisting of a series of sharp turns in alternating directions.

According to the present invention, when the ferrite cores are used in the inductive coupler, the magnetic sheet or nonmagnetic portion in the protective sheet member can serve to effectively protect the mating surfaces of the cores from the damaging shock of impact, as well as to improve the surface strength, so that the possible nick or breakage of the mating surfaces due to the shock of impact caused when the core assemblies are joined together for the transfer of the electrical power can be forestalled successfully.

When the cores are made of laminations, on the other hand, the irregularities exposed on the abutment surfaces can be filled by the protective sheet to become flat, with the result that the saturated magnetic flux density is increased and magnetic resistance decreased at the mating surfaces, thereby reducing the gap loss and hence improving the efficiency of electrical power transferring.

The slit formed in the magnetic sheet intended to reduce the eddy current loss can also contribute to improvement in the power transferring efficiency.

The above and other objects and features of the invention will be apparent from the following detailed description of the preferred embodiments thereof in conjunction with the accompanying drawings.

DETAILED DESCRIPTION OF THE EMBODIMENTS

Figure 1:
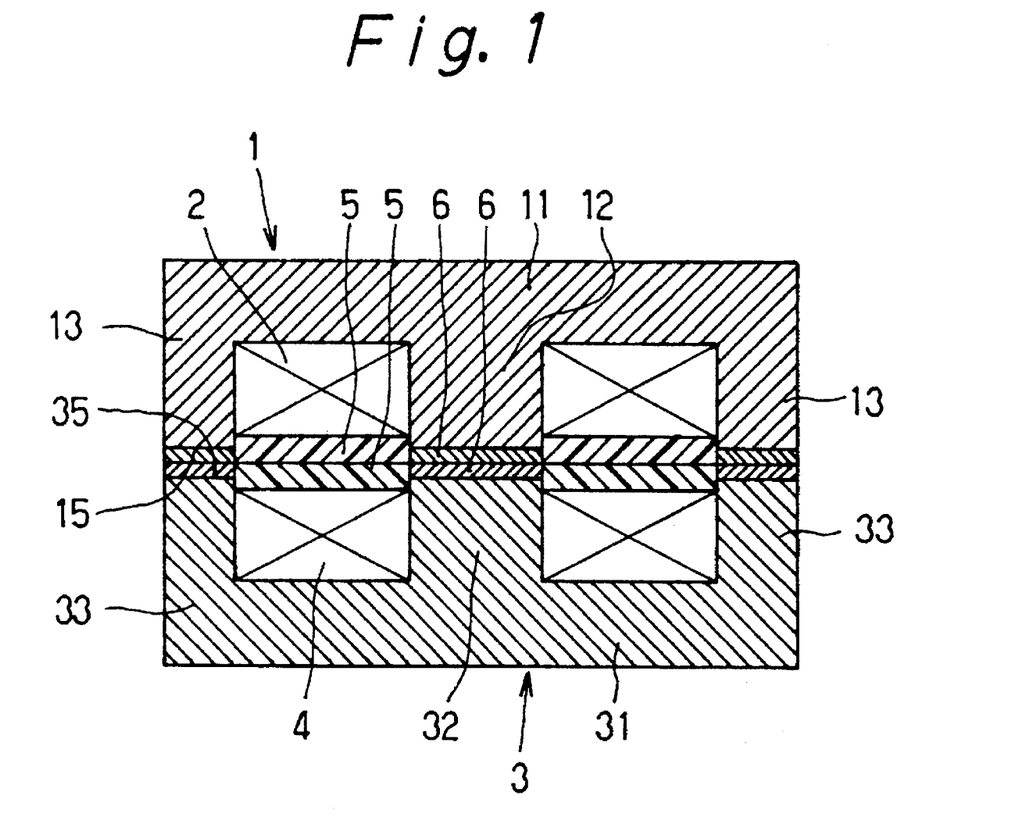
FIG. 1 is an axial cross section showing an embodiment of an inductive coupler constructed according to the invention.

EMBODIMENT 1:

Referring to FIG. 1 showing the first embodiment according to the present invention, the inductive coupler is comprised of a power supplying section, or a primary core assembly that includes a primary core 1 having a primary coil 2 connected to a source of electrical power (not shown), and a power receiving section, or a secondary core assembly that includes a secondary core 3 having a secondary coil 4 connected to a load (not shown). In this embodiment, the secondary core assembly 3, 4 is disposed stationary, while the power supplying section 1, 2 is adapted to be displaceable relative to the secondary counterpart to be mated therewith or detached therefrom as required by manual or power operation. In FIG. 1, the primary and secondary cores assemblies are shown in their mated state wherein a closed magnetic circuit is formed for transferring the electrical power from the primary winding 2 to the secondary winding 4.

The primary and secondary cores 1, 3 are made of substantially identically shaped ferrite cores, including disc-shaped bases 11, 31, cylindrical central leg portions 12, 32 extending inwardly from the axial center of their associated bases in alignment with each other, and peripheral leg portions 13, 33, that are actually skirt-like projections as viewed in transverse section, extending inwardly from the periphery of the bases. The distal ends of the leg portions 12, 13 and 32, 33 define mating surfaces 15, 35 of the primary and secondary cores 1, 3, respectively. As understood from the core geometry, the mating surfaces defined by the central leg portions 12, 32 are circular planes, and the jointing surfaces of the peripheral leg portions 31, 32 are annular by shaped.

As indicated in FIG. 1, the primary and secondary coils 2, 4 are wound around the central leg portions 12, 32 of the primary and secondary cores 1, 3, respectively. To protect the coils 2, 4, each of their inner faces is coated with a thin layer 5 of heat-resistant resin or rubber such as nylon 66, Teflon, silicon rubber, fluororubber, etc.

Figure 2:
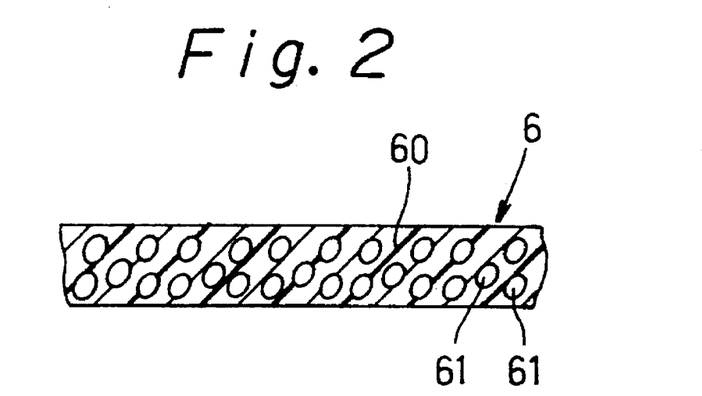
FIG. 2 is an enlarged cross-sectional view depicting part of a magnetic protective sheet attached to a mating surface of one core of the inductive coupler of FIG. 1.

To protect the abutment surfaces 15, 35 of the primary and secondary cores 1, 3, each such surface is clad with a thin sheet 6 having magnetic properties. As shown in FIG. 2, the magnetic protective sheet 6 is provided by an elastic sheet 60 made of resin or rubber and containing therein soft magnetic particles 61 having high permeability, and attached to a mating surface by means of any suitable adhesive. The magnetic particles 61 may be made of, ferrite, for example, which is the same material as the cores or permalloy having a small hysteresis loss. The protective sheet 6 in the embodiment has a thickness ranging from about 10 μm to about 2 mm and contains about 30% to 95% magnetic particles by weight. Since the process of manufacturing such a magnetic sheet or film is known per se, no further description will be made as to how to make the same.

In operation, as a voltage is applied across the primary winding 2 in the state where both primary and secondary core assemblies are closed as shown in FIG. 1, a magnetic circuit is provided between the cores 1, 3 with a gap formed therebetween and a voltage is induced across the secondary winding 4, accordingly. The inductive coupler in the embodiment having the protective layer 6 on the respective mating surfaces 15, 35 of the core assemblies can offer the following advantages.

The shock of impact applied to the mating surfaces 15, 35 when the surfaces are just abutted against each other to close the core assemblies for the transfer of the electrical power can be absorbed or dampened by and dispersed in the magnetic protective sheets 6 without being concentrated to a specific point on the abutment surfaces. Thus, the cores can be protected safely from such concentrated shock of impact which may result in damage to their mating surfaces. Furthermore, the magnetic sheets 6 can improve the mechanical strength of the abutment surfaces 15, 35 of the cores.

The use of the protective layers 6 containing therein magnetic particles with high permeability can have the effect of reducing the metal-to-metal gap between the primary and secondary cores, which could not be achieved by the use of the resin film proposed by the above-cited prior art, with the result that the magnetic resistance of the magnetic circuit formed by the two separate core assemblies and the magnetic flux leakage can be substantially reduced, the exciting current to be applied to the primary winding decreased, and the power transferring efficiency improved.

Additionally, the sheets 6 can be allowed to be yieldably compressed by the virtue of its elasticity when subjected to a force acting in the direction to reduce the gap due to the weight of either one of the cores 1, 3 mated or by pressing either or both of the cores toward each other by use of any urging means. Obviously, the compression of the protective sheets 6 will increase the density ratio of magnetic particles in the sheet, thereby reducing the magnetic resistance of the sheet.

The above-described first embodiment of the invention can be modified in various ways as exemplified below.

An additional protective layer such as 5 or 6 may be coated on the external surfaces of the cores 1, 3.

The protective sheet 6 may contain therein fibers having magnetic properties instead of magnetic particles. Alternatively, the magnetic layer 6 may be provided by a single sheet made of permalloy or silicon steel having high magnetic permeability or of an amorphous sheet having very little hysteresis loss. Furthermore, the jointing surfaces 15, 35 of the primary and secondary cores 1, 3 may be formed with amorphous material plated thereto. It is also noted that the magnetic protective sheet 6 does not have to be applied necessarily to the entire mating surface, but a magnetic sheet may have formed therein a plurality of voids which are filled with elastic material such as rubber or resin.

Each of the cores may be made up of a number of substantially identical E-shaped laminae or thin plates of silicon steel or the like metal which are laminated together to the desired thickness so as to provide a lamination core for the inductive coupler having an E-shape as seen in its front view. In such E-shaped core, its mating surfaces are defined by the ends of the respective laminae exposed on the ends of the three leg portions of the resulting core and, therefore, the surfaces tend to become irregular in flatness so that a gap will be formed between the primary and secondary cores when they are jointed together, thereby causing a gap loss which may seriously affect the power transferring efficiency. However, the use of a protective layer such as 6 can fill the irregularities on the mating surfaces to reduce the gap loss. For the irregularities to be filled properly, it is desirable that the protective layer be elastic or the abutment ends be formed by plating.

Figure 3:
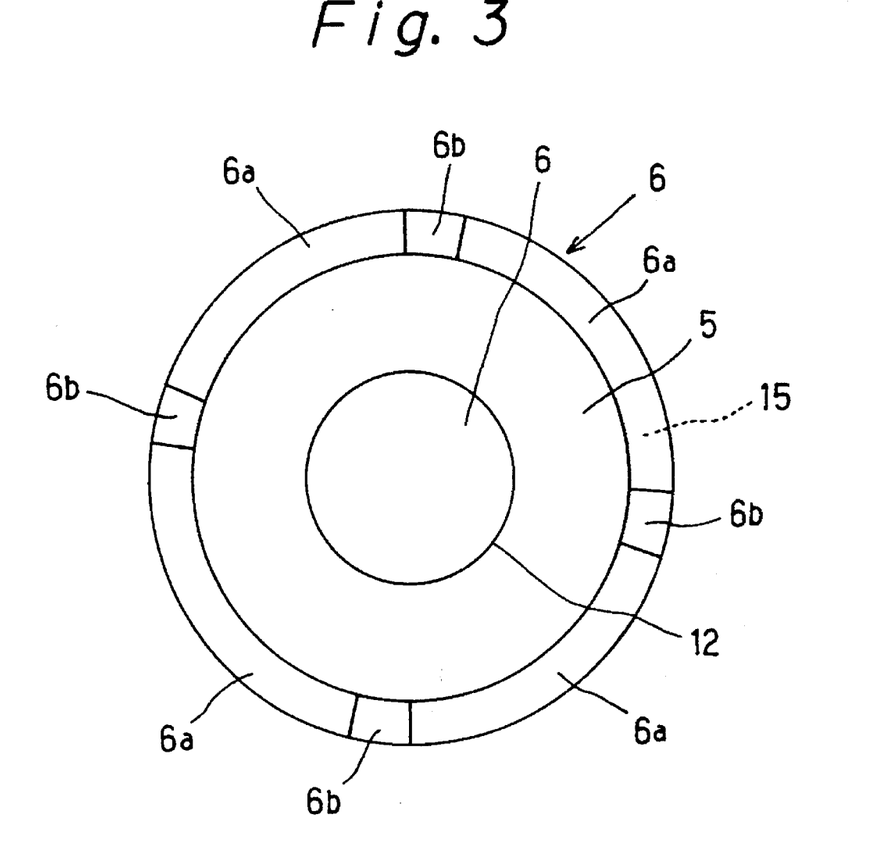
FIG. 3 is a plan view of magnetic protective sheets according to a second embodiment of the invention.

EMBODIMENT 2:

The second embodiment of the inductive coupler according to the invention is illustrated in FIG. 3 which shows the primary core 1 as seen axially from the other secondary core 3. In the following description, like parts of the inductive coupler are indicated by like reference numerals.

The inductive coupler of this embodiment differs from that of the first embodiment in that the magnetic protective sheet 6 on the annular mating surface 15 is substituted by four separate arc-shaped sheet sections 6a made of permalloy and a nonmagnetic support member made of elastic material such as rubber or resin and having interposing portions 6b formed between any two adjacent arc-shaped sheets 6a. As shown clearly in FIG. 4, the nonmagnetic support member includes a base portion between the abutment surface 15 and the magnetic sheets 6a and the above interposing portions 6b project from the base portion inwardly slightly further than the exposed surface of the magnetic sheet sections 6a. The other secondary core 3 may configured in the same way as its counterpart. In this embodiment, the elastic projections 6b receive the shock of impact when the cores are jointed and thereafter the permalloy sheet sections 6a of the two cores are brought into contact with each other. Thus, the mating surfaces 15, 35 of the cores can be protected safely from possible damaging shock.

Figure 4:
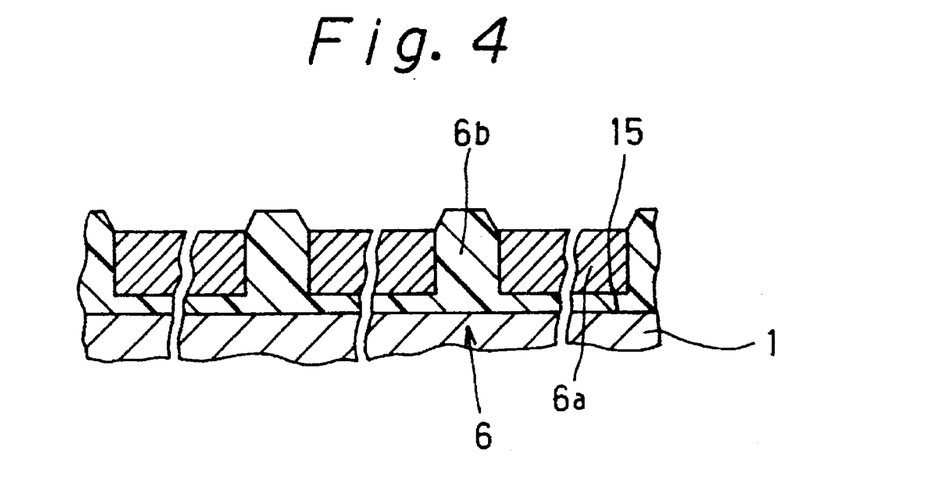
FIG. 4 is an enlarged cross-sectional view showing part of one of the magnetic protective sheets of FIG. 3.
Figure 5:
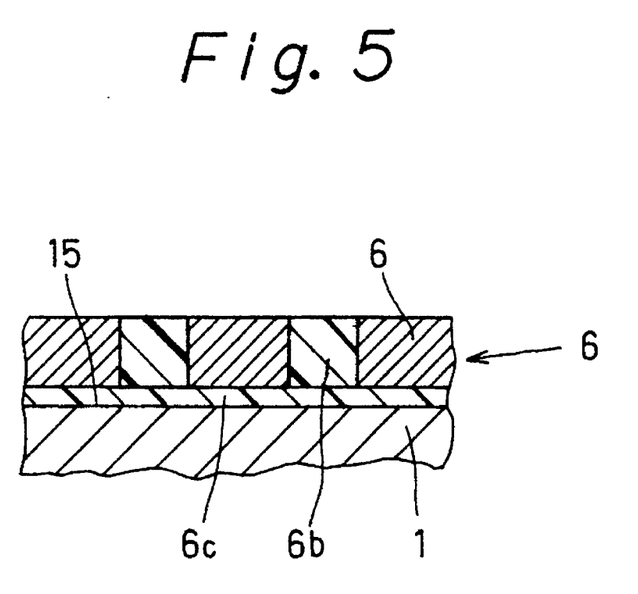
FIG. 5 is a view similar to that of FIG. 4, but illustrating a modification therefrom.

A modification from the embodiment of FIG. 4 is shown in FIG. 5, wherein the nonmagnetic interposing portions 6b are formed in flush with the permalloy sheet sections 6a, and the nonmagnetic portions 6b and the magnetic sections 6a are attached to a base portion 6c made of elastic resin film. In this embodiment, the shock of impact can be absorbed by the resin film 6c.

Figure 6:
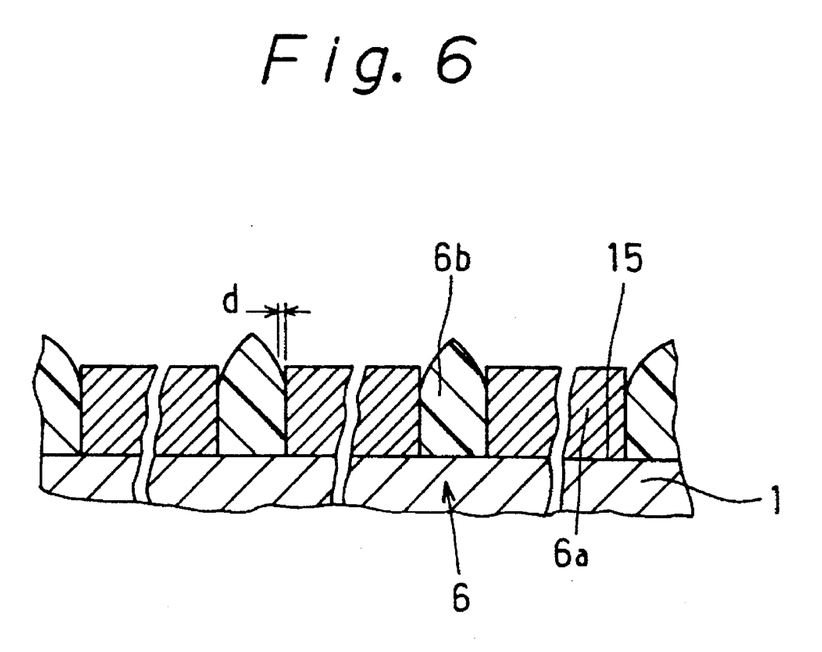
FIG. 6 is an enlarged cross-sectional view showing still another modification from the magnetic protective sheet of FIG. 3.

A further change from the embodiment of FIG. 4 is shown in FIG. 6, wherein the elastic nonmagnetic projections 6b interposed between any two adjacent permalloy sheet sections 6a are shaped in such tapered configuration that a gap d is formed round each projection adjacent the exposed surface of the magnetic sheet. The gap d can serve to accommodate the deformation of the elastic projection 6b when its tip portion is compressed with the cores closed, thus the core-to-core gap being reduced and the efficiency of power transferring being improved, accordingly.

Figure 7:
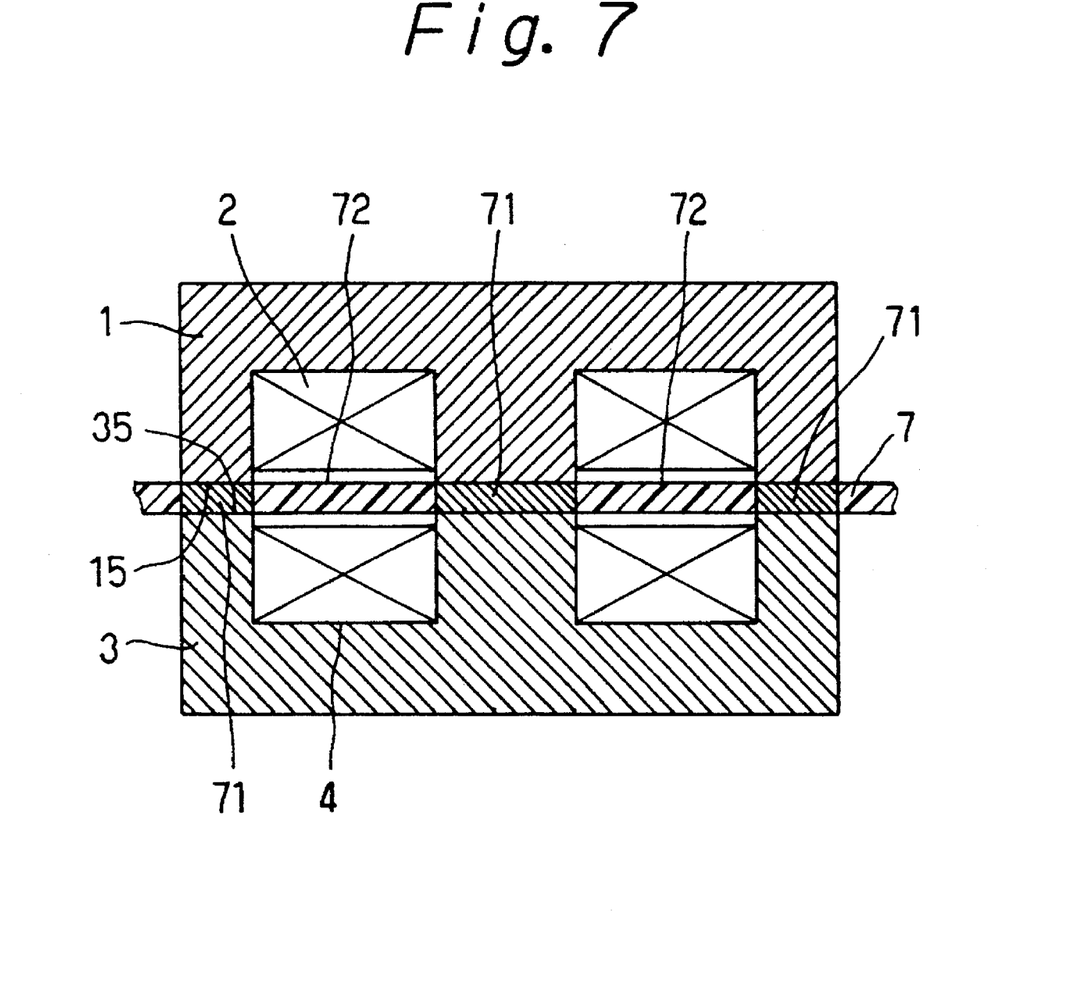
FIG. 7 is a cross-sectional view of an inductive coupler of a third embodiment according to the invention.

EMBODIMENT 3:

Reference is made to FIG. 7 illustrating the third embodiment of the invention. This embodiment differs from the first embodiment of FIG. 1 in that the magnetic sheets 6 between the mating surfaces 15, 35 and the heat-resistant insulating layers 5 between the primary and secondary windings 2, 4 are replaced with a single protective sheet 7 which is separable from the primary and secondary cores 1, 3 and is placed to be held between the cores when they are mated together for the transfer of the electrical power. The protective sheet 7 has a thickness of about 2 mm and is comprised of magnetic portions 71 which are to be placed in the circular and annular regions between the mating surfaces 15, 35 of the core assemblies and nonmagnetic support portions 72 which are formed integral by with the magnetic portions and to be placed in the regions between the primary and secondary coils 2, 4 and radially outside the mated core assemblies, as shown in FIG. 7. The magnetic and nonmagnetic portions 71, 72 may be joined by any suitable means. This embodiment is advantageous in that a worn protective sheet 7 can be replaced with a new one.

Figure 8A:
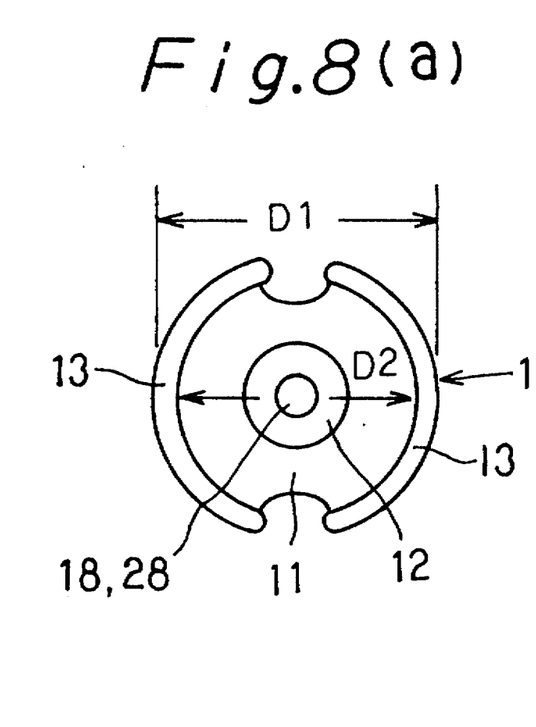
FIGS. 8(a) and (b) provide plan and sectional views of an inductive coupler which was used for evaluation testing.
Figure 8B:
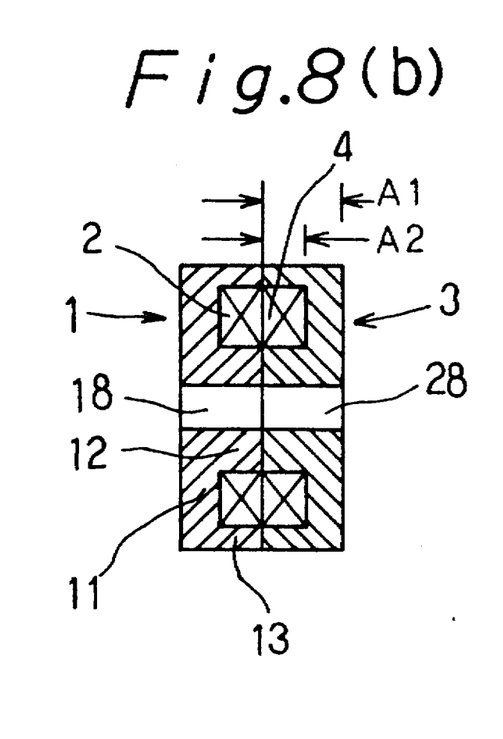

Reference is now made to FIGS. 8(a) and 8(b) showing a primary core in plan view and primary and secondary core assemblies in cross sectional, view respectively, which were used for the experiment to determine the power transferring efficiency under three different conditions which will be stated later herein. The primary and secondary cores 1, 3 were made of ferrite, but differ from those cores illustrated in the first and second embodiments in that the peripheral legs are divided into two arc-shaped leg portions by radially opposite cuts and also that the central legs have aligned through holes 18, 28. Each of the cores 1, 3 was 35.5 mm in the outer diameter D1; 29.9 mm in the inner diameter D2; 11 mm in height A1; 7.3 mm in the depth A2 of annular groove for accommodating therein the coil. The diameter of the through holes 18, 28 was 5.4 mm and the diameter of the central leg 12 was 16 mm. The primary coil had as many as 9 turns of winding, while the secondary coil had 17 turns. With a voltage of 10 volts at 80 Hertz applied across the primary winding, the output voltage induced across the secondary winding was measured in the experiment.

For the purpose of the experiment, three different inductive couplers were prepared using the above primary and secondary core assemblies, namely: (a) a coupler having magnetic protective sheets with about 10 μm thickness made of Fe-Ni-P amorphous film and attached to the mating surfaces of the core assemblies; (b) a coupler having protective Teflon film having about a 10 μm thickness and attached to the mating surfaces; and (c) a coupler with no attachment of protective sheet of film.

Figure 9:
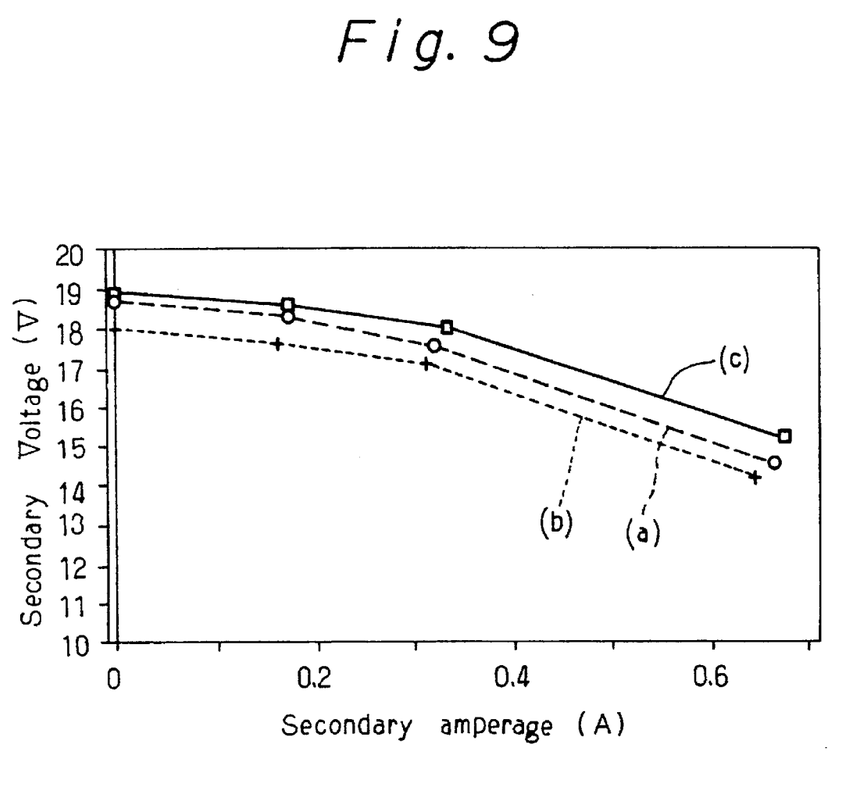
FIG. 9 is a characteristic diagram showing the results from the evaluation testing.

As seen from the experiment results provided in FIG. 9, it was found that the use of magnetic sheet according to the present invention was effective in increasing the output secondary voltage over the use of conventional nonmagnetic resin film.

Figure 10:
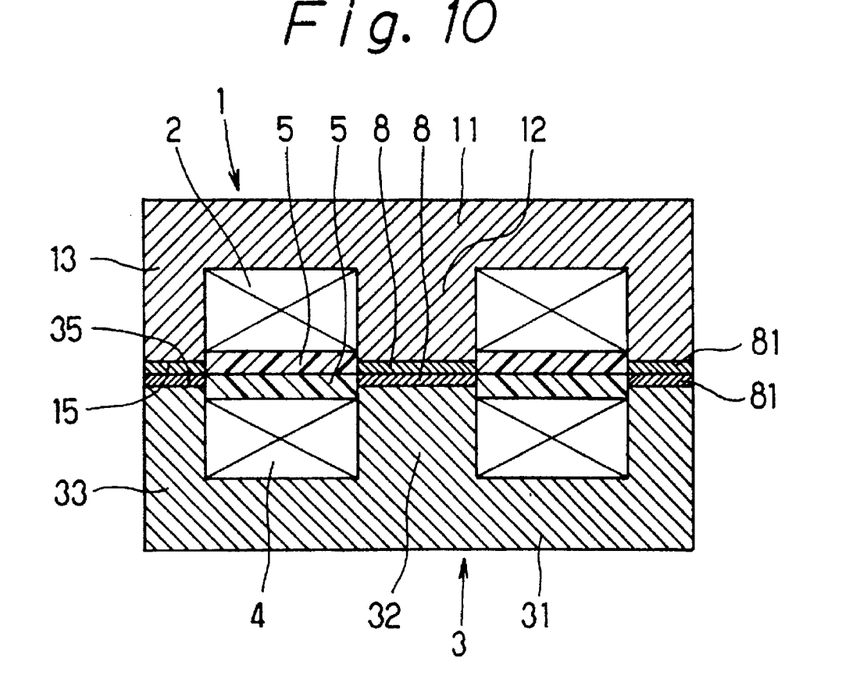
FIG. 10 is a cross-sectional view of an inductive coupler of a fourth embodiment according to the invention.
Figure 11:
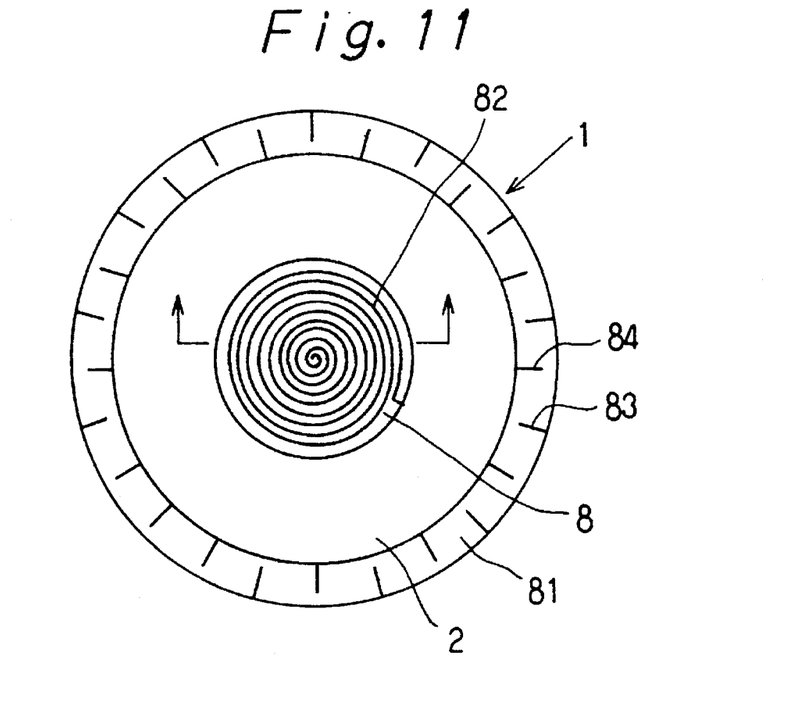
FIG. 11 is a plan view of magnetic protective sheets used in the inductive coupler of FIG. 10.
Figure 12:
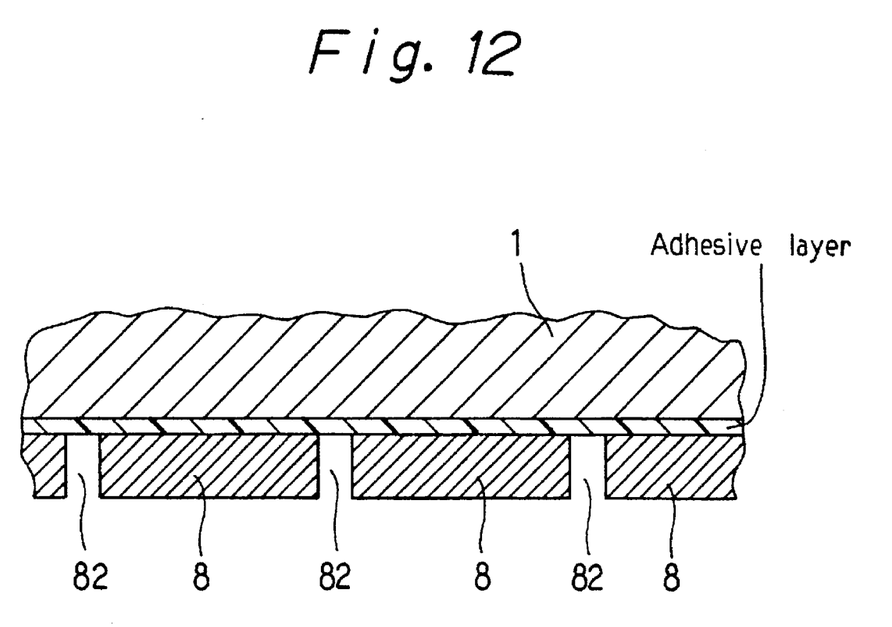
FIG. 12 is an enlarged cross-sectional view showing part of one magnetic protective sheet of FIG. 11.

EMBODIMENT 4:

Referring to FIGS. 10, 11 and 12 showing the fourth embodiment of the invention, the inductive coupler thereof includes a thin protective sheet 8 of magnetic material which is affixed to each of the mating surfaces 15, 35 of the central leg portions 12, 32 of the primary and secondary cores 1, 3 by means of an adhesive, and a similar magnetic protective sheet 81 attached to the mating surfaces on the peripheral leg portions 13, 33. Each of these sheets 8, 81 is made from 10

μm to 2 mm thick permalloy film having electrically conductive properties.

As seen in FIG. 11 showing in plan view the protective sheets 8, 81 attached to the primary core 1, the disc-shaped sheet 8 is formed on its surface with a slit 82 extending spirally outward and the annular-shaped sheet 81 is formed with a number of straight slits 83, 84 extending radially halfway the sheet width alternately from the inner and outer peripheral edges of the annular sheet so that eddy currents produced in the sheet flow along a zigzag path consisting of a series of sharp turns in alternating directions. The annularly shaped protective sheet 81 has an outer diameter of about 74 mm, an inner diameter of about 60 mm and a radial width of about 7 mm. Each of the slits 82, 83, 84 is about 0.5 mm in width, the radial slit-to-slit distance in radial direction of the spiral slit 82 is about 3 mm, and the length of each slit 83, 84 is about 5 mm.

The permalloy has a low hysteresis loss, high saturated magnetic flux density and offers good mechanical properties in tensile strength, compression strength and impact resistance, whereas it suffers from a remarkable eddy current loss due to its low electrical resistivity. According to this embodiment, however, the provision of the slits 82, 83, 94 can expand the equivalent length of the path of eddy currents flowing circumferentially of the core thereby to increase the electrical resistance of the eddy current path, thus helping to reduce the eddy current loss.

Although reduction in the eddy current loss can be accomplished by dividing the sheets 8, 81 into a plurality of discrete sections, formation of the slits 82, 83, 84 to increase the equivalent length of the eddy current path can serve for the same purpose without dividing the respective sheets into separate sections which would be difficult to be handled in being affixed to the mating surfaces of the cores. Incidentally, the slits 82 or 83, 84 may be formed simultaneously by punching a sheet of magnetic foil.

The above fourth embodiment may be changed in various ways as exemplified below.

The protective sheets 8, 81 may be made of other materials than permalloy, such as pure soft iron sheet, amorphous film, etc. that have high electrical conductivity and magnetic permeability. Alternatively, layers of the protective sheets 8, 81 may be formed on the abutment surfaces 15, 35 of the cores by plating. It is noted, however, that electroless plating is desirable in forming a plated protective layer on a ferrite core. Slit formation can be accomplished by applying grease or any other masking material to the mating surface at positions where the slits are to be made, plating the surface, and then removing the masking material from the surface.

Alternate slits such as 83, 84 may be formed on the protective sheet 8, while the annular sheet 81 may be provided with a spiral slit such as 82.

Each of the magnetic protective sheets 8, 81 does not have to be made of a single sheet, but it may be divided into a plurality of sections. For the sake of ease of affixing such plural sections on the mating surface, it is desirable that all the sections should be firstly attached on a thin resin film and then the film with the magnetic sections thereon is affixed to the mating surface. The resin film may be removed afterward, as required.

The slits 83, 84 in the protective sheet 81 may be formed to extend all the way across the sheet width so that the sheet is sectioned into a number of small pieces. In so doing, the eddy current path is cut off and the eddy current loss can be reduced because small eddy currents produced in each piece can be canceled by the eddy currents developed in its adjacent pieces.

The magnetic protective sheets 8, 81 in this fourth embodiment are also applicable to the mating surfaces of the above-described laminated cores made of silicon steel plates or amorphous sheets to fill the irregularities on the mating surfaces with the sheets for providing flat mating surfaces.

What is claimed is:

1. An inductive coupler comprising a primary core assembly having a primary winding, a secondary core assembly having a secondary winding, said primary and secondary core assemblies being matable and separable at the mating surfaces thereof thereof to form a magnetic circuit for transferring electrical power from said primary winding to said secondary winding by electromagnetic induction, and at least one of said primary and secondary core assemblies having attached to its mating surface a thin magnetic sheet of elastomeric material containing magnetic particles.

2. An inductive coupler comprising a primary core assembly having a primary winding, a secondary core assembly having a secondary winding, said primary and secondary core assemblies being matable and separable at the mating surfaces thereof thereby to form a magnetic circuit for transferring electrical power from said primary winding to said secondary winding by electromagnetic induction, and a sheet member having magnetic portions and nonmagnetic portions formed integrally with said magnetic portions, said sheet member being placed with said magnetic and nonmagnetic portions thereof held between said mating surfaces of said primary and secondary core assemblies in the mated position thereof, and said nonmagnetic portions being made of an elastomeric material.

3. An inductive coupler according to claim 2, wherein said magnetic portions of said sheet member are made of an elastomeric material containing therein magnetic particles.

4. An inductive coupler comprising a primary core assembly having a primary winding, a secondary core assembly having a secondary winding, said primary and secondary core assemblies being matable and separable at the mating surfaces thereof thereby to form a magnetic circuit for transferring electrical power from said primary winding to said secondary winding by electromagnetic induction, and a sheet member having a magnetic portion and a nonmagnetic portion formed integrally with said magnetic portion, said nonmagnetic portion of said sheet member projecting slightly further than the surface of said magnetic portion of the sheet member with the sheet member formed such that a clearance is provided between said magnetic and nonmagnetic portions, said sheet member being placed with said magnetic portion thereof held between said mating surfaces of said primary and said secondary core assemblies in the mated position thereof.

5. An inductive coupler comprising a primary core assembly having a primary magnetic core structure including a plurality of primary pole faces and a primary winding, a secondary core assembly having a secondary magnetic core structure including a plurality of secondary pole faces and a secondary winding, said primary and secondary core assemblies being matable and separable at mating surfaces thereof, pole face to pole face, thereby to form a magnetic circuit for transferring electrical power from said primary winding to said secondary winding by electromagnetic induction, and a thin layer of elastomeric material covering all of the pole faces and intervening areas of the mating surfaces of at least one of said primary and secondary core assemblies, said layer being at least coextensive with the interface between said mating surfaces when said assemblies are mated.

6. An inductive coupler according to claim 5, wherein at least a major portion of said elastomeric material that covers said pole faces contains magnetic particles while the portions of said elastomeric material that cover said intervening areas are essentially nonmagnetic.

* * * * *